United States Patent [19]

Katagiri et al.

[11] Patent Number: 4,714,323
[45] Date of Patent: Dec. 22, 1987

[54] FERROELECTRIC LIQUID CRYSTAL DEVICE HAVING CHIRAL SMECTIC AND NEMATIC LIQUID CRYSTAL COMPOSITION

[75] Inventors: Kazuharu Katagiri, Tama; Kazuo Yoshinaga, Tokyo; Shinjiro Okada, Kawasaki; Junichiro Kanbe, Yokohama, all of Japan

[73] Assignee: Canon Kabushiki Kaisha, Tokyo, Japan

[21] Appl. No.: 773,222

[22] Filed: Sep. 6, 1985

[30] Foreign Application Priority Data

Sep. 11, 1984 [JP] Japan .................. 59-191162

[51] Int. Cl.⁴ .............................. G02F 1/13
[52] U.S. Cl. ....................... 350/350 S; 350/341
[58] Field of Search ............ 350/350 S, 350 R, 341

[56] References Cited

U.S. PATENT DOCUMENTS

| | | | |
|---|---|---|---|
| 4,112,239 | 9/1978 | Dubois et al. | 350/350 R X |
| 4,139,273 | 2/1979 | Crossland et al. | 350/350 S X |
| 4,558,151 | 12/1985 | Takatsu et al. | 350/350 R X |
| 4,614,609 | 9/1986 | Inoue et al. | 350/350 S X |
| 4,622,165 | 11/1986 | Kano et al. | 350/350 S X |
| 4,668,051 | 5/1987 | Mourey et al. | 350/350 S |

Primary Examiner—Stanley D. Miller
Assistant Examiner—Richard F. Gallivan
Attorney, Agent, or Firm—Fitzpatrick, Cella, Harper & Scinto

[57] ABSTRACT

A liquid crystal device comprising a pair of base plates and a liquid crystal composition interposed between the pair of base plates; the liquid crystal composition comprising a liquid crystal compound showing at least chiral smectic phase and a liquid crystal showing at least nematic phase; a face of at least one of the pair of base plates having been provided with a function of preferentially orienting the axes of the liquid crystal molecules contacting the face in one direction.

27 Claims, 15 Drawing Figures

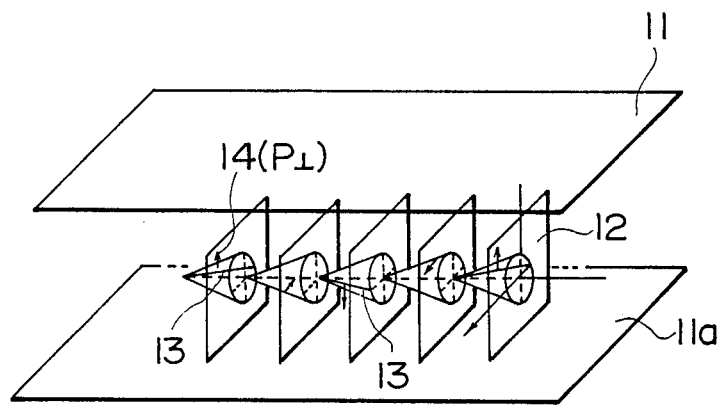
F I G. 1
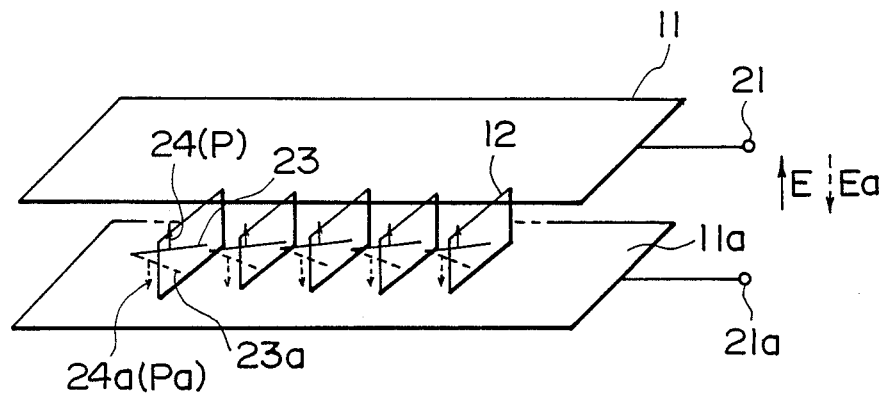
F I G. 2

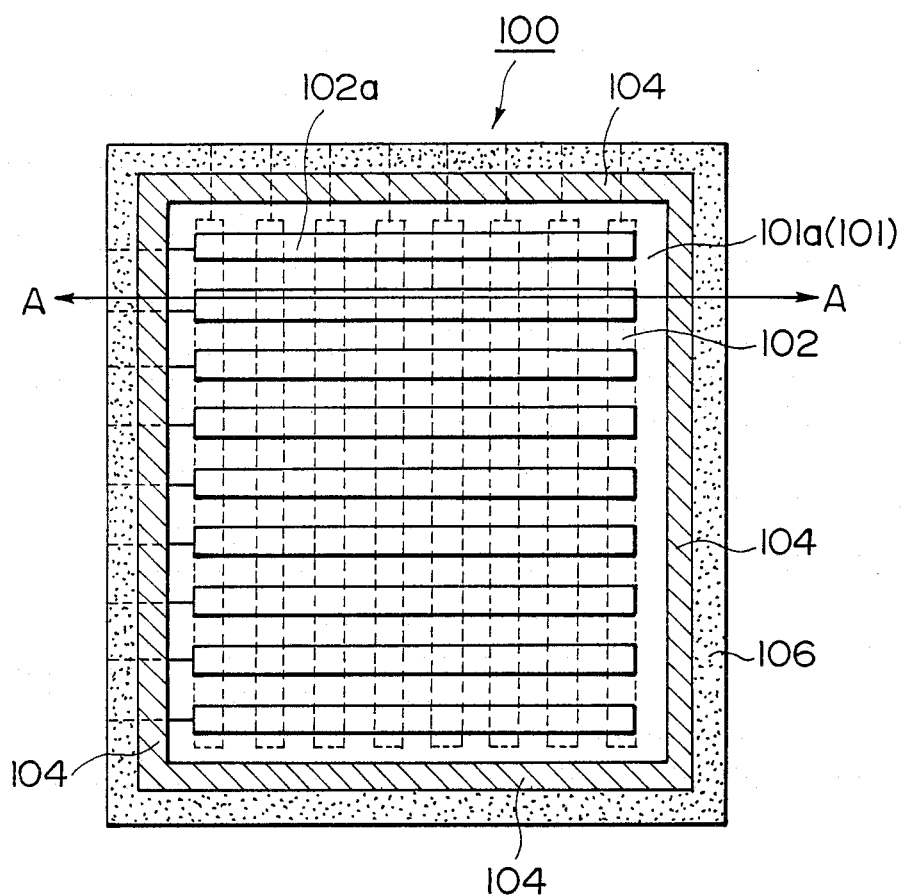
F I G. 3A

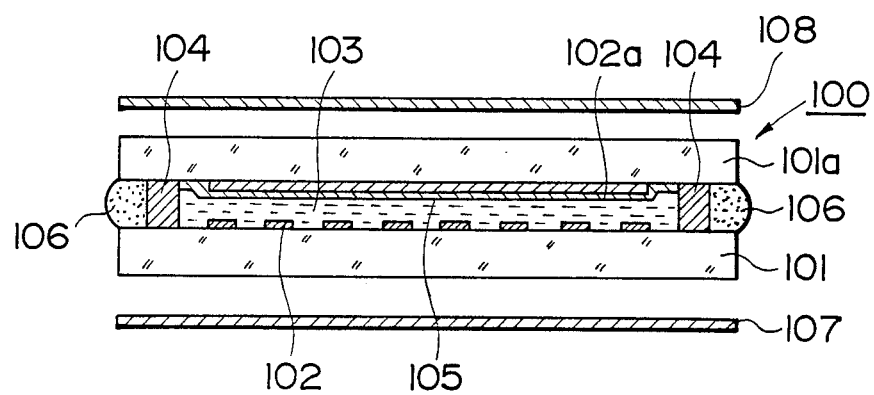
F I G. 3B
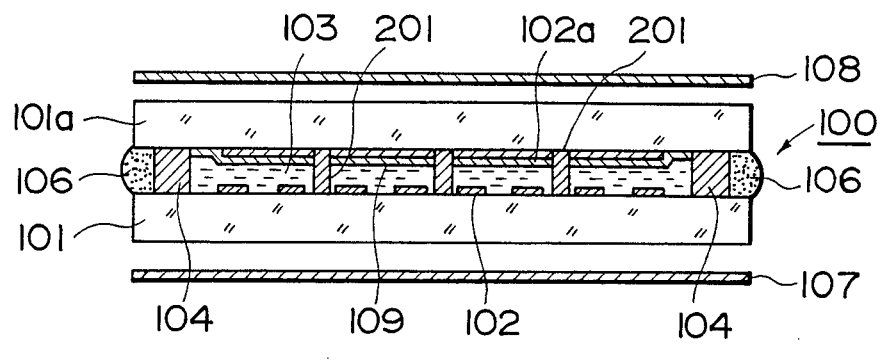
F I G. 4

FERROELECTRIC LIQUID CRYSTAL DEVICE HAVING CHIRAL SMECTIC AND NEMATIC LIQUID CRYSTAL COMPOSITION

FIELD OF THE INVENTION AND RELATED ART

The present invention relates to a liquid crystal device for use in a liquid crystal display device, an optical shutter array, etc., and more particularly to a liquid crystal device having improved display and driving characteristics, because of improved initial alignment or orientation of liquid crystal molecules.

Liquid crystal display devices for displaying a pattern or information have been well known in which a plurality of scanning electrodes and a plurality of signal electrodes are arranged in the form of a matrix and liquid crystals are interposed between the scanning and signal electrodes, whereby a plurality of picture elements are defined. In order to drive such liquid crystal display devices, a time-division driving method is used in which an address signal is applied sequentially and periodically to the scanning electrodes and, in synchronism with the address signal, predetermined information signals are selectively applied to the signal electrodes in parallel. Such liquid crystal display devices and the methods for driving them have serious defects as will be described below.

Thus, it is difficult to increase the density of picture elements or the size of a picture. Liquid crystals which have been used in practice in liquid crystal display device because of their fast response and their low electric power consumption are twisted nematic liquid crystals of the kind disclosed in, for instance, "Voltage Dependent Optical Activity of a Twisted Nematic Liquid Crystals", M. Schadt and W. Helfrich in Applied Physics Letters, Vol. 18, No. 4, (February 15, 1971), pages 127–128. The liquid crystals of this kind assume a helical structure in which the molecules of a nematic liquid crystal having a positive dielectric anisotropy are twisted in the direction of the thickness of the crystal liquid and are arranged in parallel with each other between electrodes when it is not applied with an electric field. When an electric field is applied, the molecules of the nematic liquid crystal with a positive dielectric anisotropy are oriented in the direction of the electric field, causing optical modulation. In the case of a display device in which a liquid crystal of the kind described is used and which has a matrix of electrodes, a voltage higher than a threshold voltage required for arranging the molecules of the liquid crystal in the direction perpendicular to the surfaces of the electrodes is applied to a region (selected point) at which both a scanning electrode and a signal electrode are selected and no voltage is applied to a region (non-selected point) at which neither a scanning electrode nor a signal electrode is selected. As a result, the molecules of the liquid crystal are maintained in a stable state in which they are in parallel with the surfaces of the electrodes. When linear polarizers are disposed upon the upper and lower surfaces of a liquid crystal cell or device of the type described in cross nicol relationship, a selected point prevents the transmission of light while a non-selected point permits the transmission of light, whereby a display or picture device is formed. However, in the case of a liquid crystal device with a matrix of electrodes, a finite electric field is applied to a region (the so-called "semi-selected or half-selected point") in which a scanning electrode is selected while a signal electrode is not selected or in which a scanning electrode is not selected while a signal electrode is selected. When the difference between a voltage applied to a selected point and a voltage applied to a half-selected point is sufficiently large and if a threshold voltage at which the molecules of a liquid crystal are oriented in the direction perpendicular to an electric field applied is between the above described voltages, the correct operation of a display element can be ensured. However, when the number (N) of scanning lines is increased, a time period (duty ratio) during which one selected point is subjected to an effective electric field during the time when one frame is scanned is decreased at a ratio of 1/N. As a consequence, in the case of repetitive scanning, the greater the number of scanning lines, the smaller the effective voltage difference between a selected point and a non-selected point becomes. As a result, the problems of reduction in contrast of a picture and of crosstalk are unavoidable. These essentially unavoidable problems result when a driving method (that is, a repetitive scanning method) in which a liquid crystal which is not bistable (that is, a liquid crystal in which the molecules assume a stable state in which they are oriented in the horizontal direction relative to the surfaces of the electrodes and are oriented in the vertical direction only when an effective electric field is applied) is driven by utilizing a time storage effect. In order to overcome these problems, there have been proposed a voltage averaging method, a two-frequency driving, a multiple matrix method and so on. However, neither of them is not satisfactory in solving the above described problems. Therefore, it is impossible at present to provide a display device with a large picture size and with a high density of picture elements because it is impossible to increase the number of scanning lines.

Meanwhile, a laser beam printer (LBP) in which the electrical signals representing a pattern are applied in the form of a light pattern to an electrophotographic sensitive member is most excellent as a means for obtaining a hard copy in response to the electrical input signals in the field of printers from the viewpoint of the density of picture elements and the copying speed. However, the laser beam printers have some defects as follows:

1. First, they are large in size as a printer.
2. Second, they have moving parts such as a polygon scanner which are driven at high speeds so that noise is produced and these moving parts must be machined with a higher degree of dimensional accuracy.

In order to overcome the above and other problems, there has been proposed the use of a liquid crystal shutter array which is a means for converting electrical signals into optical signals. However, in the case of generating the picture-element signals with a liquid crystal shutter array, more than 3000 signal generators are needed in order to write the picture-element signals in a length of 210 mm at a rate of 16 dots per millimeter. Furthermore it is required to apply independent signals to these signal generators through respective lead wires. For these reasons, it has been difficult to provide a liquid crystal shutter array.

In order to overcome the above and other problems, another attempt has been made to apply one line of image signals in a time sharing manner by signal generators divided into a plurality of times. This method makes it possible to use a common electrode in order to apply a signal to a plurality of signal generators. As a result, the number of conductors can be reduced remarkably. However, when a liquid crystal lacking bistability is used and when the number (N) of lines is increased, the ON time of a signal is substantially reduced to 1/N. As a result, there arise the problems that the quantity of light incident on a photosensitive member is decreased and that crosstalk occurs.

In order to obviate the above-mentioned drawbacks of the conventional types of liquid crystal devices, Clark and Lagerwall have proposed the use of a liquid crystal device using a bistable liquid crystal (Japanese Laid-Open Patent Application No. 107216/1981, U.S. Pat. No. 4,367,924, etc.). The bistable liquid crystal to be used may be a ferroelectric liquid crystal having a chiral smectic C (SmC*) phase or another phase such as chiral smectic H (SmH*) phase, chiral smectic F (SmF*) phase, chiral smectic I (SmI*) phase, chiral smectic G (SmG*) phase, chiral smectic J (SmJ*) phase or chiral smectic K (SmK*) phase.

Such a ferroelectric liquid crystal has bistability, i.e., has two stable states comprising a first stable state and a second stable state. Accordingly, different from the conventional TN-type liquid crystal in the above-mentioned device, the liquid crystal is oriented to the first stable state in response to one electric field vector and to the second stable state in response to the other electric field vector. Further, this type of liquid crystal very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type liquid crystal device. This point will be explained hereinafter in further detail in connection with the present invention.

However, in order that an optical modulation device using the liquid crystal having bistability could show desired operation performances, the liquid crystal interposed between a pair of parallel base plates is required to be placed in such a state of molecular arrangement that the transition between the two stable states can effectively occur, as a matter different from or a precondition of the application of an electric field. With respect to, for example, a ferroelectric liquid crystal having an SmC* or other phases, there must be formed a monodomain wherein the layers of the liquid crystal molecules are perpendicular to the face of the base plate and therefore the axes of the liquid crystal molecules are almost in parallel with the base plate face. However, in the optical modulation devices using a bistable liquid crystal, an orientation or alignment state of a liquid crystal having such a monodomain structure cannot satisfactorily be formed, whereby the optical modulation device cannot actually show sufficient performances.

For example, several methods have been proposed to give such an orientation state, including a method of applying a magnetic field and a method of applying a shearing force. These methods have not necessarily provided satisfactory results. For example, the method of applying a magnetic field requires a large size apparatus and is not readily compatible with a thin layer cell which is generally excellent in operation performances. On the other hand, the method of applying a shearing force is not compatible with a process where a cell structure is first formed and then a liquid crystal is poured thereinto.

SUMMARY OF THE INVENTION

A principal object of the present invention is, in view of the above mentioned circumstances, to provide an improvement in monodomain formability or initial alignment, of which an improvement has been desired, to an optical modulation device using a bistable liquid crystal, which is potentially suited for a display device with a high response speed, picture elements arranged at a high density and a large display area or an optical shutter having a high shutter speed, thereby to allow the optical modulation device to fully exhibit their excellent characteristics.

We have made a further study with the above object, noting the orientation characteristics of a liquid crystal during a temperature decreasing stage for causing transition from another phase (e.g., a higher temperature phase such as an isotropic phase) of the liquid crystal to a lower temperature phase such as a smectic phase, e.g., SmA (smectic A phase). As the result, we have observed that a monodomain where liquid crystal molecules of, e.g., smectic A phase are aligned in one direction can be formed by using a liquid crystal composition comprising a liquid crystal compound showing at least a chiral smectic phase such as chiral smectic C (SmC*) phase, chiral smectic H (SmH*) phase, chiral smectic F (SmF*) phase, chiral smectic J (SmJ*) phase, chiral smectic K (SmK*) phase, chiral smectic I (SmI*) pahse or chiral smectic G (SmG*) phase and a liquid crystal compound showing at least a nematic phase, and by imparting a function of orienting the molecular axes of the liquid crystal molecules preferentially in one direction to a face of a base plate contacting the liquid crystal composition, whereby a liquid crystal device having operation characteristics based on the bistability of the liquid crystal and a monodomain formation characteristic of the liquid crystal layer in combination is provided.

The liquid crystal device according to the present invention is based on the above finding and, more particularly, comprises a pair of base plates and a liquid crystal composition interposed between the pair of base plates; the liquid crystal composition comprising a liquid crystal compound showing at least chiral smectic phase and a liquid crystal compound showing at least nematic phase; a face of at least one of the pair of base plates having been provided with a function of preferentially orienting the axes of the liquid crystal molecules contacting the face in one direction.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic perspective views illustrating the basic operation principle of a liquid crystal cell used in the present invention, FIG. 3A is a plan view showing an example of the liquid crystal device according to the present invention, FIG. 3B is a sectional view taken along the line A—A in FIG. 3A, FIG. 4 is a sectional view showing another example of the liquid crystal device according to the present invention.

DESCRIPTION OF THE PREFERRED EMBODIMENTS

Figure 5:
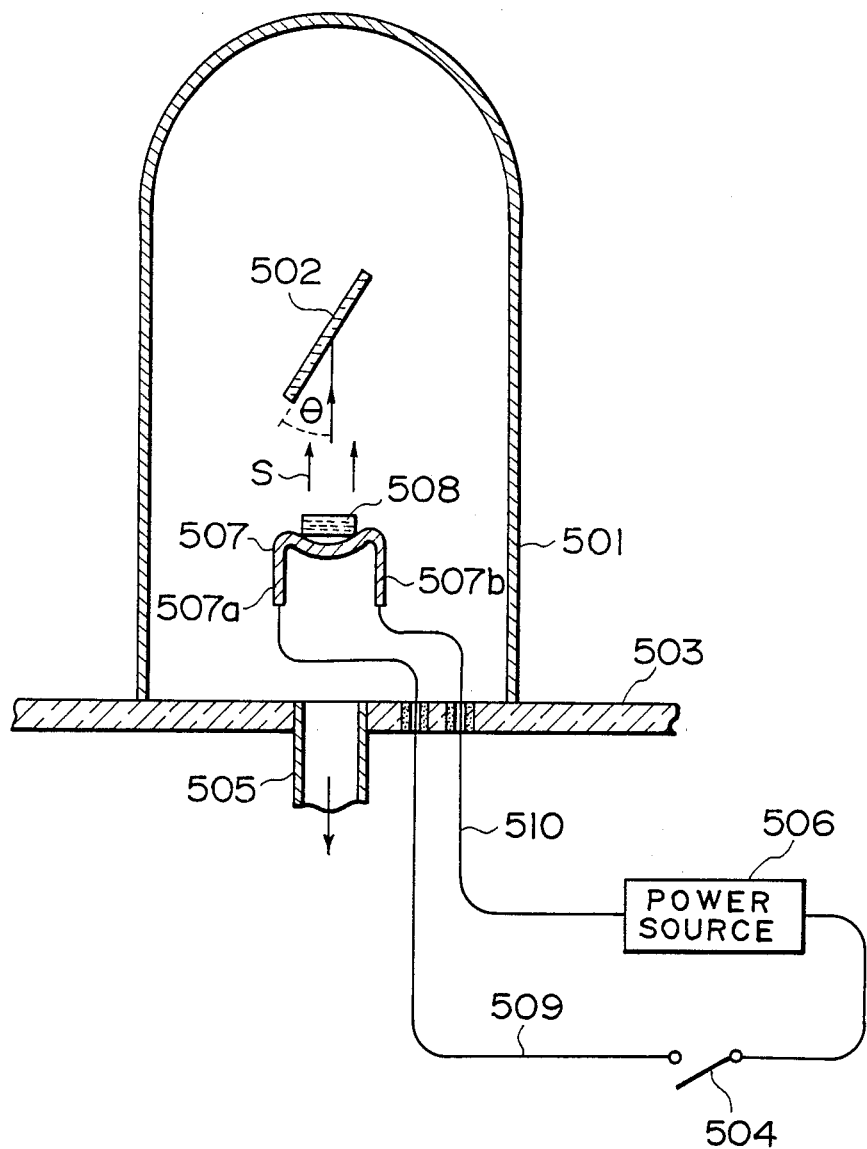
FIG. 5 is a sectional view schematically showing a tilt or oblique vapor deposition apparatus for use in production of the liquid crystal device according to the present invention.

The liquid crystal composition used in the present invention is one which comprises a liquid crystal compound showing at least a chiral smectic phase such as SmC*, SmH*, SmF*, SmI* or SmG* and a liquid crystal compound showing at least nematic phase, and shows ferroelectricity.

As the chiral smectic liquid crystal compound showing a chiral smectic phase, those liquid crystal compounds causing successive phase transition of: isotropic phase, smectic A (SmA) phase and chiral smectic phase; isotropic phase, cholesteric phase, smectic A (SmA) phase and chiral smectic; or isotropic phase, cholesteric phase and chiral smectic phase, respectively in the order named on temperature decrease, may preferably be used. On the other hand, as the nematic liquid crystal, i.e., the liquid crystal compound showing nematic phase, those resulting in nematic phase on temperature decrease may preferably be used.

Specific examples of the liquid crystal compounds showing a chiral smectic phase and the liquid crystal compounds showing a nematic phase available for the present invention are shown in Table 1 and Table 2, respectively.

TABLE 1

Specific examples of liquid crystal compounds showing chiral smectic phase
(compound name, structural formula and phase transition temperature)

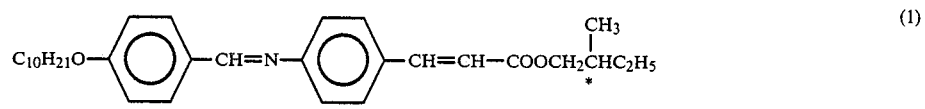

p-decyloxybenzylidene-p'-amino-2-methylbutyl cinnamate (DOBAMBC)    (1)

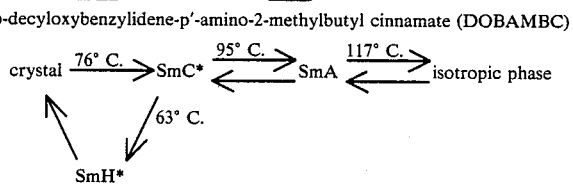

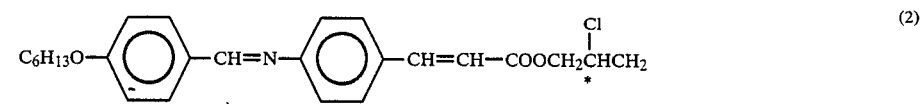

p-hexyloxybenzylidene-p'-amino-2-chloropropyl cinnamate (HOBACPC)    (2)

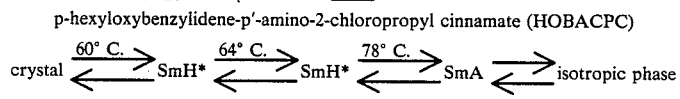

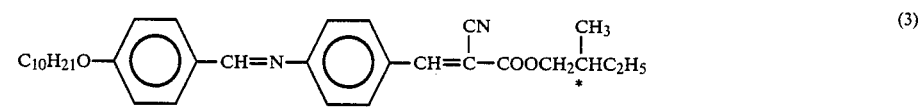

p-decyloxybenzylidene-p'-amino-2-methylbutyl-α-cyanocinnamate (DOBAMBCC)    (3)

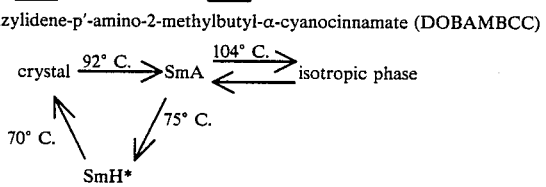

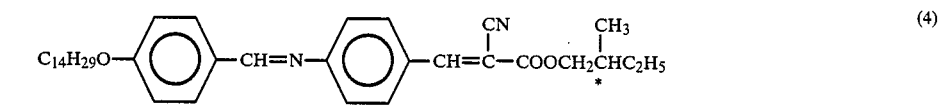

p-tetradecyloxybenzylidene-p'-amino-2-methylbutyl-α-cyanocinnamate (TDOBAMBCC)    (4)

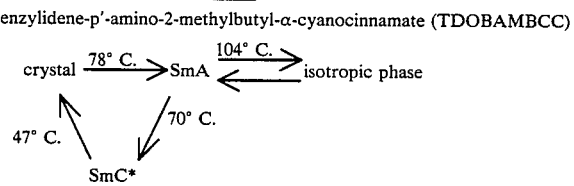

TABLE 1-continued

Specific examples of liquid crystal compounds showing chiral smectic phase
(compound name, structural formula and phase transition temperature)

(5) $C_8H_{17}O-\langle\bigcirc\rangle-CH=N-\langle\bigcirc\rangle-CH=\underset{Cl}{\overset{Cl}{C}}-COOCH_2\underset{*}{\overset{CH_3}{CH}}C_2H_5$ p-octyloxybenzylidene-p'-amino-2-methylbutyl-α-chlorocinnamate (OOBAMBCC)

crystal $\underset{27° C.}{\overset{41° C.}{\rightleftarrows}}$ SmA $\underset{}{\overset{66° C.}{\rightleftarrows}}$ isotropic phase
$\overset{38° C.}{\searrow}$ SmC*

(6) $C_8H_{17}O-\langle\bigcirc\rangle-CH=N-\langle\bigcirc\rangle-CH=\underset{*}{\overset{CH_3}{\underset{|}{C}}}-COOCH_2\overset{CH_3}{\underset{|}{CH}}CH_2C_2H_5$ p-octyloxybenzylidene-p'-amino-2-methylbutyl-α-methylcinnamate crystal $\overset{49° C.}{\rightleftarrows}$ SmC* $\overset{58° C.}{\rightleftarrows}$ SmA $\overset{94° C.}{\rightleftarrows}$ isotropic phase (7) $C_2H_5\underset{*}{\overset{CH_3}{\underset{|}{CH}}}CH_2OCO-CH=CH-\langle\bigcirc\rangle-\underset{\underset{O}{\downarrow}}{N=N}-\langle\bigcirc\rangle-CH=CH-COOCH_2\underset{*}{\overset{CH_3}{\underset{|}{CH}}}C_2H_5$ 4,4'-azoxycinnamic acid-bis(2-methylbutyl)ester crystal $\overset{121° C.}{\rightleftarrows}$ SmC* $\overset{134° C.}{\rightleftarrows}$ SmA $\overset{168° C.}{\rightleftarrows}$ isotropic phase (8) $C_2H_5\overset{CH_3}{\underset{|}{CH}}CH_2O-\langle\bigcirc\rangle-CH=N-\langle\bigcirc\rangle-C_8H_{17}$
$\phantom{C_2H_5CHCH_2O-\langle\bigcirc}\underset{OH}{}$ 4-O—(2-methyl)-butylresorcylidene-4'-octylaniline (MBRA 8)

crystal $\overset{28° C.}{\rightleftarrows}$ SmC* $\overset{55° C.}{\rightleftarrows}$ SmA $\overset{62° C.}{\rightleftarrows}$ isotropic phase (9) $C_8H_{17}-O-\langle\bigcirc\rangle-\langle\bigcirc\rangle-COO-\langle\bigcirc\rangle-CH_2\overset{CH_3}{\underset{|}{CH}}C_2H_5$
$\phantom{xxxxxxxxxxxxxxxxxxxxxxxxxxxxxxxxxxxxxxxxx}*$ 4-(2'-methylbutyl)phenyl-4'-octyloxybiphenyl-4-carboxylate crystal $\overset{78° C.}{\rightleftarrows}$ Sm3 $\overset{80° C.}{\rightleftarrows}$ SmC* $\overset{128.3° C.}{\rightleftarrows}$ SmA $\overset{171.0° C.}{\rightleftarrows}$ cholesteric phase $\overset{174.2° C.}{\rightleftarrows}$ isotropic phase
(unknown phase)

(10) $C_2H_5\overset{CH_3}{\underset{|}{CH}}CH_2-\langle\bigcirc\rangle-\langle\bigcirc\rangle-COO-\langle\bigcirc\rangle-OC_6H_{13}$
$\phantom{xxxxx}*$ 4-hexyloxyphenyl-4-(2''-methylbutyl)biphenyl-4'-carboxylate crystal $\overset{68.8° C.}{\rightleftarrows}$ SmC* $\overset{80.2° C.}{\rightleftarrows}$ cholesteric phase $\overset{163.5° C.}{\rule{1cm}{0.4pt}}$ isotropic phase

(11) $C_2H_5\overset{CH_3}{\underset{|}{CH}}CH_2-\langle\bigcirc\rangle-\langle\bigcirc\rangle-COO-\langle\bigcirc\rangle-OC_8H_{17}$
$\phantom{xxxxx}*$ 4-octyloxyphenyl-4-(2''-methylbutyl)biphenyl-4'-carboxylate crystal $\overset{76° C.}{\rightleftarrows}$ SmC* $\overset{88.6° C.}{\rightleftarrows}$ cholesteric phase $\overset{155.4° C.}{\rightleftarrows}$ isotropic phase TABLE 1-continued Specific examples of liquid crystal compounds showing chiral smectic phase
(compound name, structural formula and phase transition temperature)

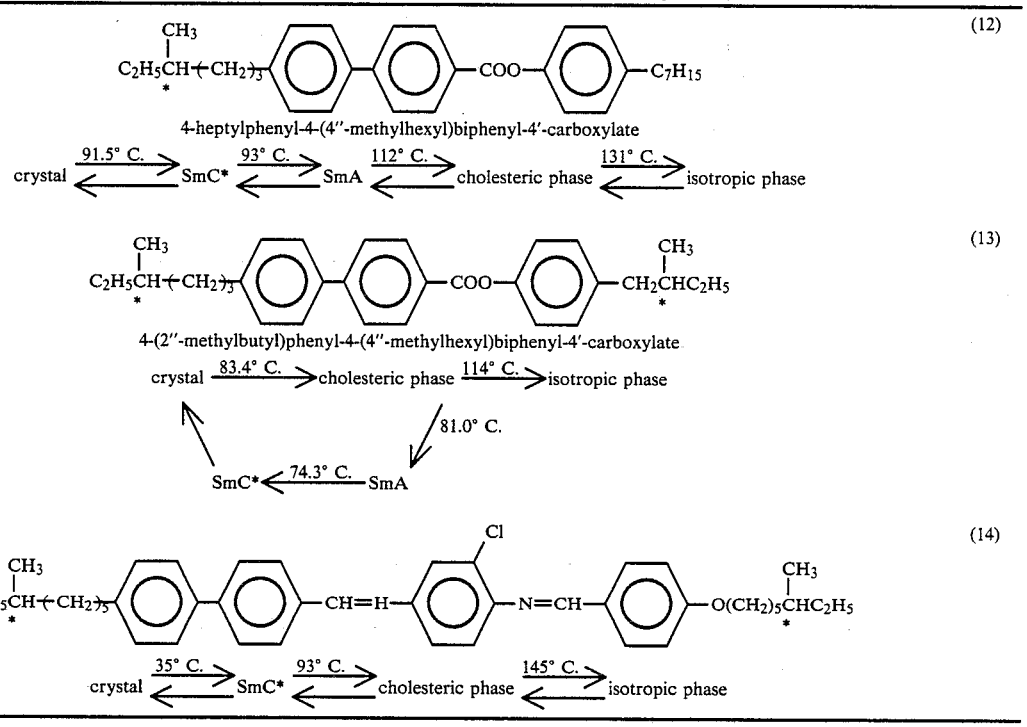

TABLE 2

Specific examples of liquied crystal compounds showing nematic phase (compound name, structural formula and phase transition temperature)

N—(4-ethoxybenzylidene)-4-n-hexylaniline (A)

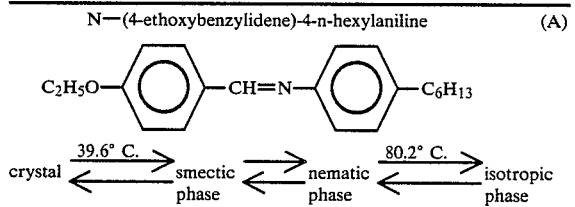

N—(4-n-butoxybenzylidene)-4-n-octyl-2-methylaniline (B)

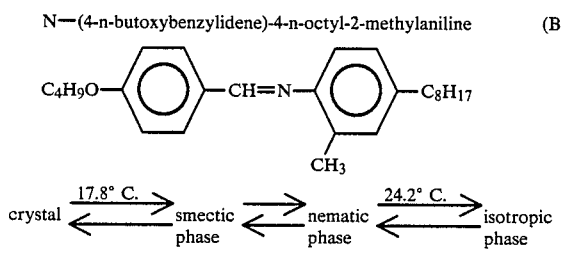

4-n-pentyl-4'-methoxyazobenzene (C)

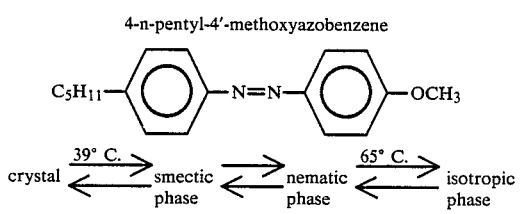

4-n-hexyl-4'-n-butoxyazobenzene (D)

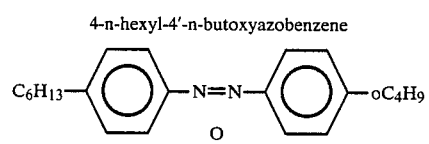

TABLE 2-continued

Specific examples of liquied crystal compounds showing nematic phase (compound name, structural formula and phase transition temperature)

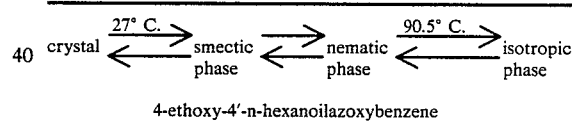

4-ethoxy-4'-n-hexanoilazoxybenzene (E)

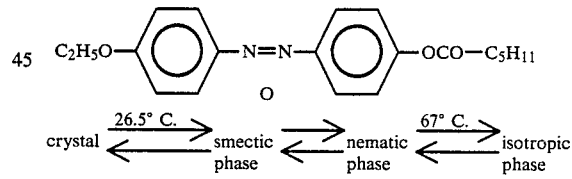

4-n-butylbenzoic acid-4'-n-hexyloxyphenyl ester (F)

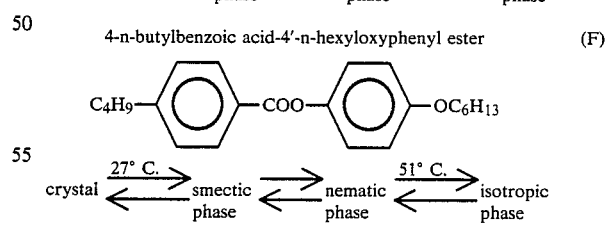

4-n-hexyloxybenzoic acid-4'-n-heptyloxyphenyl ester (G)

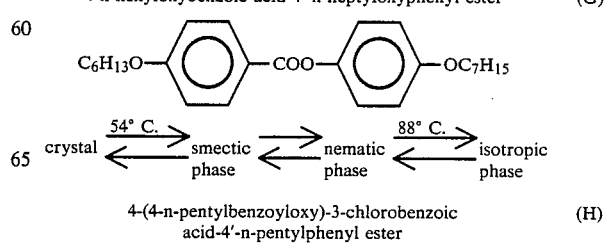

4-(4-n-pentylbenzoyloxy)-3-chlorobenzoic acid-4'-n-pentylphenyl ester (H)

TABLE 2-continued

Specific examples of liquied crystal compounds showing nematic phase (compound name, structural formula and phase transition temperature)

(I) 4-(4-n-pentylphenyl)benzoic acid-4'-cyanophenyl ester $C_5H_{11}$—⬡—COO—⬡—Cl—COO—⬡—$C_5H_{11}$ crystal $\xrightleftharpoons{39°\ C.}$ smectic phase $\xrightleftharpoons{}$ nematic phase $\xrightleftharpoons{122°\ C.}$ isotropic phase $C_5H_{11}$—⬡—⬡—COO—⬡—CN crystal $\xrightleftharpoons{110.8°\ C.}$ smectic phase $\xrightleftharpoons{}$ nematic phase $\xrightleftharpoons{229.1°\ C.}$ isotropic phase (J) 4-n-heptyloxy-4'-cyanobiphenyl $C_7H_{15}O$—⬡—⬡—CN crystal $\xrightleftharpoons{13.5°\ C.}$ smectic phase $\xrightleftharpoons{}$ nematic phase $\xrightleftharpoons{27°\ C.}$ isotropic phase (K) 4-n-octyl-4'-cyanobiphenyl $C_8H_{17}$—⬡—⬡—CN crystal $\xrightleftharpoons{21°\ C.}$ smectic phase $\xrightleftharpoons{}$ nematic phase $\xrightleftharpoons{40°\ C.}$ isotropic phase (L) 4-hexyloxy-4'-cyanobiphenyl $C_6H_{13}O$—⬡—⬡—CN crystal $\xrightleftharpoons{58°\ C.}$ smectic phase $\xrightleftharpoons{}$ nematic phase $\xrightleftharpoons{76.5°\ C.}$ isotropic phase (M) 4-(trans-4-pentylcyanohexyl)benzonitrile $C_5H_{11}$—⬡—⬡—CN crystal $\xrightleftharpoons{31°\ C.}$ smectic phase $\xrightleftharpoons{}$ nematic phase $\xrightleftharpoons{55°\ C.}$ isotropic phase (N) trans, trans-4'-propyldicyclohexyl-4-carbonitrile $C_3H_7$—⬡—⬡—CN crystal $\xrightleftharpoons{58°\ C.}$ smectic phase $\xrightleftharpoons{}$ nematic phase $\xrightleftharpoons{80°\ C.}$ isotropic phase (O) trans-4(4"-n-pentylcyclohexyl)-4'-cyanobiphenyl $C_5H_{11}$—⬡—⬡—⬡—CN crystal $\xrightleftharpoons{94°\ C.}$ smectic phase $\xrightleftharpoons{}$ nematic phase $\xrightleftharpoons{219°\ C.}$ isotropic phase (P) 4-n-propyl-4"-cyano-p-terphenyl $C_3H_7$—⬡—⬡—⬡—CN crystal $\xrightleftharpoons{182°\ C.}$ smectic phase $\xrightleftharpoons{}$ nematic phase $\xrightleftharpoons{257.5°\ C.}$ isotropic phase (Q) 5-n-hexyl-2-(4-hexyloxyphenyl)pyrimidine $C_6H_{13}$—⟨N⟩—⬡—$OC_6H_{13}$ crystal $\xrightleftharpoons{31°\ C.}$ smectic phase $\xrightleftharpoons{}$ nematic phase $\xrightleftharpoons{60.5°\ C.}$ isotropic phase (R) 5-n-heptyl-2-(4-cyanophenyl)pyrimidine $C_7H_{15}$—⟨N⟩—⬡—CN crystal $\xrightleftharpoons{44.5°\ C.}$ smectic phase $\xrightleftharpoons{}$ nematic phase $\xrightleftharpoons{51°\ C.}$ isotropic phase (S) 5-cyano-2-(4-n-pentyloxyphenyl)pyrimidine

NC—⟨N⟩—⬡—$OC_5H_{11}$ crystal $\xrightleftharpoons{98°\ C.}$ smectic phase $\xrightleftharpoons{}$ nematic phase $\xrightleftharpoons{133°\ C.}$ isotropic phase The above mentioned liquid crystal compounds showing a chiral smectic phase and liquid crystals showing a nematic phase may also be used in combinations of two or more species, respectively, from each group.

While the proportion between the two types of liquid crystal compounds can vary depending on particular liquid crystal compounds used, the liquid crystal compound showing nematic phase may generally be used in an amount of 0.1 to 50 parts by weight, preferably 1 to 20 parts by weight with respect to 100 parts by weight of the liquid crystal compound showing a chiral smectic phase.

When a device is constituted by using these materials, the device may be supported with a block of copper, etc., in which a heater is embedded in order to realize a temperature condition where the liquid crystal composition assumes a desired chiral smectic phase.

Referring to FIG. 1, there is schematically shown an example of a ferroelectric liquid crystal cell for explanation of the operation thereof. Reference numerals 11 and 11a denote base plates (glass plates) on which a transparent electrode of, e.g., $In_2O_3$, $SnO_2$, ITO (Indium-Tin Oxide), etc., is disposed respectively. A liquid crystal of a chiral smectic phase such as SmC*, SmH*, SmF*, SmI* or SmG* in which liquid crystal molecular layers 12 are oriented perpendicular to surfaces of the glass plates is hermetically disposed therebetween. A full line 13 shows liquid crystal molecules. Each liquid crystal molecule 13 has a dipole moment ($P_\perp$) 14 in a direction perpendicular to the axis thereof. When a voltage higher than a certain threshold level is applied between electrodes formed on the base plates 11 and 11a, a helical structure of the liquid crystal molecule 13 is loosened or unwound to change the alignment direction of respective liquid crystal molecules 13 so that the dipole moments ($P_\perp$) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

The liquid crystal layer in the liquid crystal device of the present invention may be rendered sufficiently thin in thickness (e.g., less than $10\mu$). As the thickness of the liquid crystal layer is decreased, the helical structure of the liquid crystal molecules is loosened even in the absence of an electric field whereby the dipole moment assumes either of the two states, i.e., P in an upper direction 24 or Pa in a lower direction 24a as shown in FIG. 2. When electric field E or Ea higher than a certain threshold level and different from each other in polarity as shown in FIG. 2 is applied to a cell having the above-mentioned characteristics, the dipole moment is directed either in the upper direction 24 or in the lower direction 24a depending on the vector of the electric field E or Ea. In correspondence with this, the liquid crystal molecules are oriented to either a first stable state 23 or a second stable state 23a.

When the above-mentioned ferroelectric liquid crystal is used as an optical modulation element, it is possible to obtain two advantages as briefly touched on hereinbefore. First is that the response speed is quite fast. Second is that the orientation of the liquid crystal shows bistability. The second advantage will be further explained, e.g., with reference to FIG. 2. When the electric field E is applied to the liquid crystal molecules they are oriented in the first stable state 23. This state is kept stable even if the electric field is removed. On the other hand, when the electric field Ea of which direction is opposite to that of the electric field E is applied thereto, the liquid crystal molecules are oriented to the second stable state 23a, whereby the directions of molecules are changed. This state is similarly kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible.

The most serious problem encountered in forming a device using such a ferroelectric liquid crystal has been, as briefly mentioned hereinbefore, that it is difficult to form a cell having a highly uniform monodomain wherein liquid crystal layers having a chiral smectic phase such as SmC*, SmH*, SmF*, SmI* or SmG* are aligned perpendicular to the base plate phases and the liquid crystal molecules are aligned almost in parallel with the base plate phases. A principal object of the invention is to provide a solution to this problem.

FIGS. 3A and 3B illustrate an example of the liquid crystal device according to the present invention. FIG. 3A is a plan view of the example and FIG. 3B is a sectional view taken along the line A—A in FIG. 3A.

A cell structure 100 shown in FIG. 3 comprises a pair of base plates 101 and 101a made of glass plates or plastic plates which are held with a predetermined gap with spacers 104 and sealed with an adhesive 106 to form a cell structure. On the base plate 101 is further formed an electrode group (e.g., an electrode group for applying scanning voltages of a matrix electrode structure) comprising a plurality of transparent electrodes in a predetermined pattern, e.g., of a stripe pattern. On the base plate 101 is formed another electrode group (e.g., an electrode group for applying signal voltages of the matrix electrode structure) comprising a plurality of transparent electrodes 102a crossing the transparent electrodes 102.

On the base plate provided with such transparent electrodes may be further formed an orientation controlling film 105 composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

The orientation controlling film 105 may be formed by first forming a film of an inorganic insulating material or an organic insulating material as described above and then rubbing the surface thereof in one direction with velvet, cloth, paper, etc.

In another preferred embodiment according to the present invention, the orientation controlling film 105 may be formed as a film of an inorganic insulating material such as SiO or $SiO_2$ on the base plate 101a by the oblique or tilt vapor deposition.

In an apparatus shown in FIG. 5, a bell jar 501 is placed on an insulating base plate 503 provided with a suction hole 505 and a vacuum in the bell jar 501 is made by operating a vacuum pump (not shown) connected the suction hole 505. A crucible 507 made of tungsten or molybdenum is place inside and at the bottom of the bell jar 501. In the crucible 507 is placed several grams of a crystal such as SiO, $SiO_2$ or $MgF_2$. The crucible 507 has two downwardly extending arms 507a and 507b, which are respectively connected to lead wires 509 and 510. A power source 506 and a 504 are connected in series to the lead wires 509 and 510 outside the bell jar 501. A base plate 502 is disposed inside the bell jar 501 and right above the crucible 507 so that it forms an angle of $\theta$ with respect to the vertical axis of the bell jar 501.

First, the bell jar 501 is evacuated to a vacuum of about $10^{-5}$ mmHg while the switch 504 is open. Then the switch 504 is closed to supply a power while adjusting an output of the power source 506 until the crucible is heated to an incandescent state of an appropriate temperature for evaporating the crystal 508. About 100 amps. of current is required for giving an appropriate temperature range (700°–1000° C.). The crystal 508 is then evaporated off to form an upward molecular stream denoted by S in the figure. The stream S is incident on the base plate 502 with an angle thereto of θ to coat the base plate 502. The angle θ is the above mentioned incident angle and the direction of the stream S is the "oblique or tilt vapor deposition direction". The thickness of the film is determined based on the calibration of the thickness with respect to the operation time which is effected prior to the introduction of the base plate 502 into the bell jar 501. After an appropriate thickness of the film is formed, a power supply from the source 506 is decreased, the switch 504 is opened, and the bell jar 501 and the interior thereof are cooled. Then, the pressure in the bell jar is raised to atmospheric pressure and the base plate 502 is taken out from the bell jar 501.

In still another embodiment, the orientation controlling film 105 may be formed by first forming a uniform film of the above-mentioned inorganic or organic insulating material on, i.e., in contact with or above, the base plate 101a and then subjecting the surface of the film to the oblique or tilt etching to provide the surface with an orientation controlling effect.

It is preferred that the orientation controlling film 105 is also caused to function as an insulating film. For this purpose, the orientation controlling film may preferably have a thickness in the range of 100 Å of 1μ, especially 500 Å to 5000 Å. The insulating film also has a function of preventing the occurrence of an electric current which is generally caused due to minor quantities of impurities contained in the liquid crystal layer 103, whereby deterioration of the liquid crystal compounds is prevented even after repeated operation.

In the liquid crystal device according to the present invention, it is possible to form an orientation controlling film similar to the orientation controlling film 105 also on the other base plate 101.

In the cell structure shown in FIG. 3, the liquid crystal layer 103 may be formed into a chiral smectic phase such as SmC*, SmH*, SmF*, SmI* or SmG*. The liquid crystal layer 103 showing a chiral smectic phase contains a liquid crystal compound showing nematic phase as described above, preferably a liquid crystal compound causing phase transition from nematic phase to smectic phase.

One important aspect of the present invention is that, when a liquid crystal composition containing a liquid crystal compound showing nematic phase is transformed from a higher temperature phase into the smectic phase, the axes of the liquid crystal molecules of the smectic phase are aligned or oriented in the orientation controlling direction imparted to the orientation controlling film, whereby a uniform monodomain is formed.

FIG. 4 shows another embodiment of the liquid crystal device according to the present invention. In the liquid crystal device shown in FIG. 4, a plurality of spacer members 201 are disposed between a pair of base plates 101 and 101a. The spacer members 201 can be provided, for example, by forming a film of an inorganic compound such as SiO, $SiO_2$, $Al_2O_3$ and $TiO_2$, or a resin such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin on the base plate 101 on which an orientation controlling film 105 has not been provided, and by etching the film to leave the spacer members 201 at appropriate parts.

A similar orientation effect as explained with reference to the surface of the base plate 101 or 101a can also be imparted to the side wall of the spacer members 104 and 201.

Such a cell structure 100 having base plates 101 and 101a as shown in FIG. 3 or FIG. 4 is sandwiched between a pair of polarizers 107 and 108 arranged in the form of cross nicols to form an optical modulation device causing optical modulation when a voltage is applied between electrodes 102 and 102a.

Next, a process for producing the liquid crystal device according to the present invention by orientation-controlling the liquid crystal layer 103 is explained more specifically, with reference to FIG. 3.

First, a cell 100 containing a liquid crystal according to the present invention is set in such a heating case (not shown) that the whole cell 100 is uniformly heated therein. Then, the cell 100 is heated to a temperature where the liquid crystal in the cell assumes as isotropic phase. The temperature of the heating case is decreased, whereby the liquid crystal composition is subjected to a temperature decreasing stage. In the temperature decreasing stage of the liquid crystal composition, the liquid crystal compound showing nematic phase on temperature decrease is considered to have such an effect as to cause the axes of the liquid crystal molecules to align in the rubbing direction.

Figure 6:
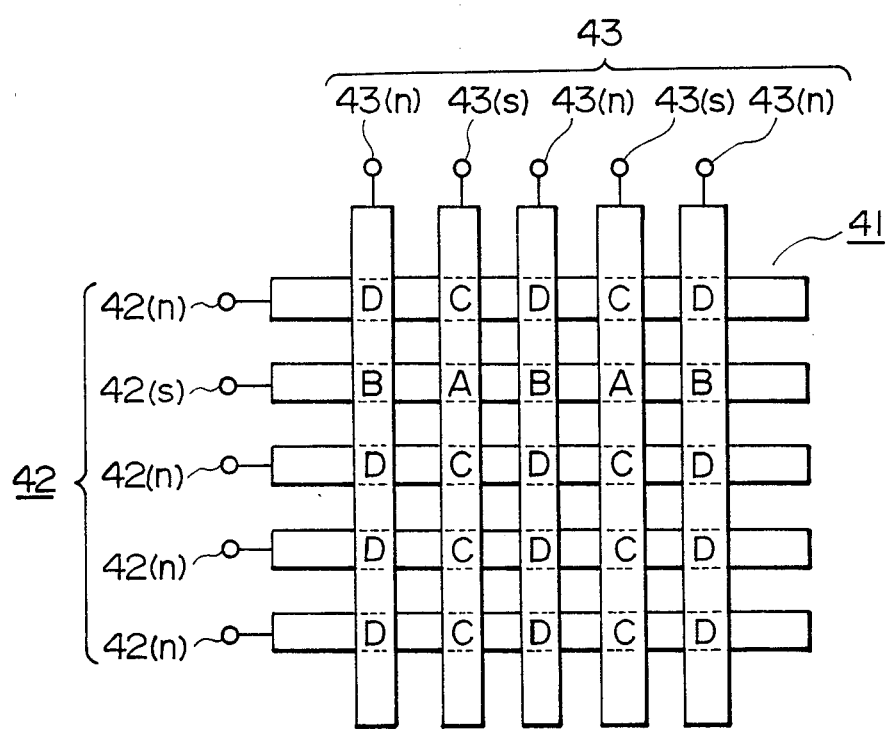
FIG. 6 is a schematic plan view showing an electrode arrangement of a liquid crystal device used in the present invention.
Figure 7A:
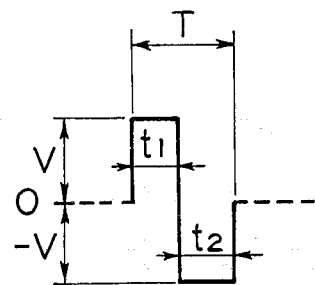
FIGS. 7A to 7D illustrate signals for driving a liquid crystal device used in the present invention.
Figure 7C:
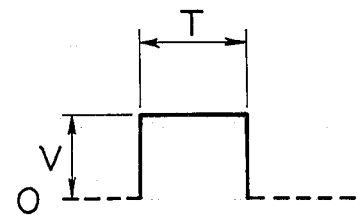
Figure 7B:
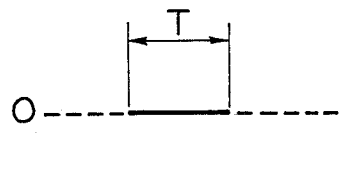
Figure 7D:
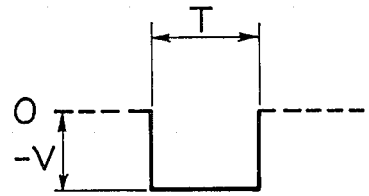
Figure 8A:
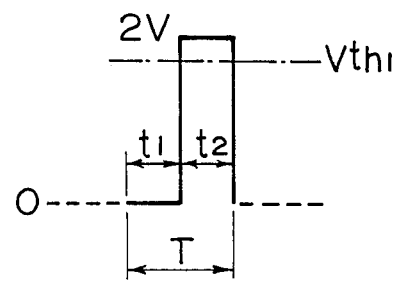
FIGS. 8A to 8D illustrate waveforms applied to respective picture elements.
Figure 8C:
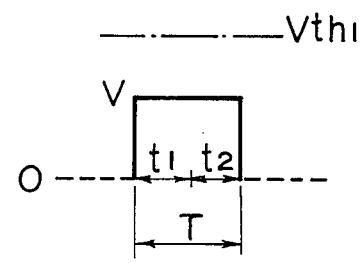
Figure 8B:
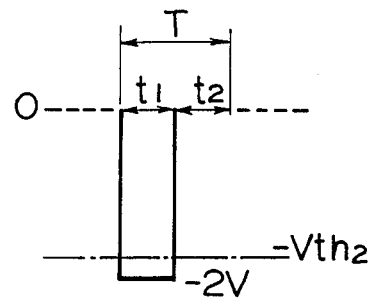
Figure 8D:
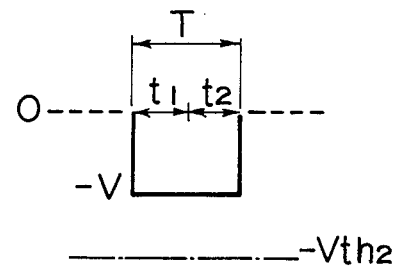

Referring to FIG. 6, there is schematically shown an example of a cell 41 having a matrix electrode arrangement in which a ferroelectric liquid crystal compound is interposed between a pair of groups of electrodes oppositely spaced from each other. Reference numerals 42 and 43 respectively denote a group of scanning electrodes to which scanning signals are applied and a group of signal electrodes to which information signals are applied. Referring to FIGS. 7A and 7B, there are respectively shown electric signals applied to a selected scanning electrode 42(s) and electric signals applied to the other scanning electrodes (non-selected scanning electrodes) 42(n). On the other hand, FIGS. 7C and 7D show electric signals applied to the selected signal electrode 43(s) and electric signals applied to the non-selected signal electrodes 43(n), respectively. In FIGS. 7A to 7D, the abscissa and the ordinate represent a time and a voltage, respectively. For instance, when displaying a motion picture, the group of scanning electrodes 42 are sequentially and periodically selected. If a threshold voltage for giving a first stable state of the liquid crystal having bistability is referred to as $V_{th1}$ and a threshold voltage for giving a second stable state thereof as $-V_{th2}$, an electric signal applied to the selected scanning electrode 42(s) is an alternating voltage showing V at a phase (time) $t_1$ and $-V$ at a phase (time) $t_2$, as shown in FIG. 7A. The other scanning electrodes 42(n) are grounded as shown in FIG. 7B. Accordingly, the electric signals appearing thereon show zero volt. On the other hand, an electric signal applied to the selected signal electrode 43(s) shows V as indicated in FIG. 7C while an electric signal applied to the nonselected signal electrode 43(n) shows $-V$ as indicated to a desired value which satisfies $V<V_{th1}<2V$ and $-V>-V_{th2}>-2V$. Voltage waveforms applied to each picture element when such electric signals are given are shown in FIG. 8. Waveforms shown in FIGS. 8A, 8B, 8C and 8D correspond to picture elements A, B, C and D shown in FIG. 6, respectively. Namely, as seen from FIG. 8A, a first signal voltage of 2V above the threshold level $V_{th1}$ is applied to the ferroelectric liquid crystal at the picture elements A on the selected scanning line at a phase of $t_2$. Further, a second signal voltage of $-2V$ above the threshold level $-V_{th2}$ is applied to the ferroelectric liquid crystal at the picture elements B on the same scanning line at a phase of $t_1$. Accordingly, depending upon whether a signal electrode is selected or not on a selected scanning electrode line, the orientation of the liquid crystal molecules changes. Namely, when a certain signal electrode is selected, the liquid crystal molecules are oriented to the first stable state, while when not selected, oriented to the second stable state. In either case, the orientation of the liquid crystal molecules is not related to the previous states of each picture element.

On the other hand, as indicated by the picture elements C and D on the non-selected scanning lines, a voltage applied to all picture elements C and D is $+V$ or $-V$, each not exceeding the threshold level. Accordingly, the ferroelectric liquid crystal molecules electrically connected to the respective picture elements C and D are placed in the orientations corresponding to signal states produced when they have been last scanned without change in orientation. Namely, when a certain scanning electrode is selected, signals corresponding to one line are written and thus writing of signals state of each picture element can be maintained until the line is subsequently selected. Accordingly, even if the number of scanning lines increases, the duty ratio does not substantially change, resulting in no possibility of lowering in contrast, occurrence of crosstalk, etc. In this instance, the magnitude of the voltage V and length of the phase $(t_1+t_2)=T$ usually ranges from 3 volts to 70 volts and from 0.1 $\mu$sec. to 2 msec. (pulse duration), respectively, although they change depending upon the thickness of a liquid crystal material or a cell used. In this way, the electric signals applied to a selected scanning electrode can cause either direction of change in state, i.e., from a first stable state (defined herein as "bright" state when converted to corresponding optical signals) to a second stable state (defined as "dark" state when converted to corresponding optical signals), or vice versa.

Compared with a case where a liquid crystal showing a chiral smectic phase such as DOBAMBC cinnamate, HOBACPC, or MBRA 8 is used alone, the liquid crystal composition used in the present invention containing a liquid crystal compound showing nematic phase has a better orientation characteristic and gives an orientation or alignment state free of orientation defects.

As for the extent of orientation controlling treatment, it is preferred to impart such an orientation controlling treatment or layer to only one of the pair of base plates in order to give a faster response speed because a weaker constraining force acting on liquid crystal molecules on the surface of the base plate (or a weaker orientation controlling effect imparted to the base plate) favors a better switching characteristic (faster response speed), especially when a thin cell is used or a chiral smectic phase such as SmC*, SmH*, SmF*, SmI* or SmG* having bistability (memory characteristic) is formed. For example, with respect to a cell having a thickness of 2 $\mu$m or less, a cell in which only one base plate has been subjected to orientation controlling treatment gives about twice as fast a response speed as that obtained by a cell in which both base plates have been treated for orientation control.

The present invention will be further explained with reference to working examples.

EXAMPLE 1

On a square glass base plate were formed ITO (Indium-Tin-Oxide) electrode films in the form of stripes with a width of 62.5 $\mu$m at a pitch of 100 $\mu$m. In an apparatus for the oblique vapor deposition as shown in FIG. 5, the base plate was disposed with its face having the ITO film being directed downward and a crystal of $SiO_2$ was set in a crucible of molybdenum. Then the vapor deposition apparatus was evacuated to a vacuum of the order of $10^{-5}$ mmHg and $SiO_2$ was obliquely vapor-deposited in a prescribed manner to form an electrode plate with an 800$\mu$-thick oblique vapor deposition film (A electrode plate).

On the other hand, on a similar glass plate provided with stripe-form ITO electrode films was applied a polyimide-forming solution ("PIQ" produced by Hitachi Kasei Kogyo K.K.; Non-volatile content: 14.5 wt. %) by means of a spinner coater, which was then heated at 80° C. for 30 minutes, at 200° C. for 60 minutes and at 350° C. for 30 minutes to form a film of 800 Å in thickness (B electrode plate).

Then, a heat-setting epoxy adhesive was applied to the periphery of the A electrode plate except for the portion forming an injection bort by screen printing process. The A electrode plate and the B electrode plate were superposed with each other so that their stripe-pattern electrodes crossed each other with right angles and secured to each other with a polyimide spacer while leaving the gap of 2$\mu$ therebetween, thereby to form a cell (blank cell).

Separately, a liquid crystal composition was prepared by mixing 5 parts by weight of 4-hexyloxy-4'-cyanobiphenyl with 100 parts by weight of p-decyloxybenzylidene-p'-amino-2-methylbutyl cinnamate (DOBAMBC) which is a liquid crystal compound causing successive phase transition of isotropic phase, SmA phase, SmC* phase and SmH* phase in the order named on temperature decrease.

The liquid crystal composition was heated into the isotropic phase and injected through the injection port of the above-prepared cell, and the injection port was sealed. The liquid crystal cell thus formed was gradually cooled and was observed through a microscope while being sandwiched between a pair of polarizers arranged in a cross nicol relationship, whereby a monodomain of SmC* phase with non-spiral structure was found to be formed.

EXAMPLE 2

On a square glass plate provided with stripe-form ITO electrode films as used in Example 1 was applied a polyimide-forming solution ("PIQ": produced by Hitachi Kasei Kogyo K.K.; Non-volatile content: 14.5 wt. %) by means of a spinner coater, which was then heated at 80° C. for 30 minutes, at 200° C. for 60 minutes and at 350° C. for 30 minutes to form a film of 800 Å in thickness (A electrode plate).

A similar electrode plate provided with a polyimide film was subjected to a rubbing treatment to produce a B electrode plate.

Then, a heat-setting epoxy adhesive was applied to the periphery of the A electrode plate except for the portion forming an injection port by screen printing process. The A electrode plate and the B electrode plate were superposed with each other so that their stripe-pattern electrodes crossed each other at right angles and secured to each other with a polyimide spacer while leaving the gap of 2μ therebetween, thereby to form a cell (blank cell).

Separately, a liquid crystal composition was prepared by mixing 10 parts by weight of trans,trans-4'-propyl-dicylohexyl-4-carbonitrile with 100 parts by weight of DOBAMBC.

The liquid crystal composition was heated into the isotropic phase and injected through the injection port of the above-prepared cell, and the injection port was sealed. The liquid crystal cell thus formed was gradually cooled and was observed through a microscope while being sandwiched between a pair of polarizers arranged in the cross nicol relationship, whereby a monodomain of an SmC* phase with non-spiral structure was found to be formed.

EXAMPLE 3

A liquid crystal device was prepared in the same manner as in Example 2 except that the DOBAMBC was replaced by 4-(2'-methylbutyl)phenyl-4'-octyloxy-biphenyl-4-carboxylate which is a liquid crystal compound causing successive phase transition of isotropic phase, cholesteric phase, SmA and SmC* pnase in the order named on temperature decrease. The liquid crystal device was observed in the same manner through a microscope, whereby a monodomain of SmC* phase with non-spiral structure was found to be formed.

EXAMPLE 4

A liquid crystal device was prepared in the same manner as in Example 2 except that the DOBAMBC was replaced by 4-octyloxyphenyl-4-(2''-methylbutyl)-biphenyl-4'-carboxylate which is a liquid crystal compound causing successive phase transition of isotropic phase, cholesteric phase and SmC* phase in the order named on temperature decrease. The liquid crystal device was observed in the same manner through a microscope, whereby a monodomain of SmC* phase with non-spiral structure was found to be formed.

EXAMPLE 5

A transparent electrode film consisting primarily of indium oxide was formed on a polyethylene terephthalate base film of 100 μm in thickness with the surface temperature of the base film being suppressed to below 120° C. by means of a low-temperature sputtering apparatus, thereby to provide a plastic substrate. A solution having the following composition (Solution Composition (1)) was applied on the plastic substrate and dried at 120° C. for 30 minutes to form a coating film.

| Solution composition (1) | |
|---|---|
| Acetomethoxyaluminum diisopropylate | 1 g |
| Polyester resin (Bylon 30 P, mfd. by Toyobo K.K.) | 0.5 g |
| Tetrahydrofuran | 100 ml |

The coating film on the plastic substrate was then rubbed in one direction under the pressure of 100 g/cm². A pair of the thus rubbing-treated plastic substrate were superposed with each other so that their rubbing directions were in parallel with each other and secured to each other with a gap of 1μ therebetween by sealing the periphery except for a port for liquid crystal injection, whereby a bland cell was prepared.

Separately, a liquid crystal composition was prepared by mixing 5 parts by weight of 5-n-hexyl-2-(4-hexyloxyphenyl)pyrimidine with 100 parts by weight of DOBAMBC.

The liquid crystal composition was heated into the isotropic phase and injected through the injection port of and into the above-provided cell under vacuum, and the injection port was sealed The liquid crystal cell thus formed was gradually cooled and was observed through a microscope while being sandwiched between a pair of polarizers arranged in a cross nicol relationship, whereby a monodomain of SmC* phase with non-spiral structure was found to be formed.

EXAMPLE 6

A liquid crystal device was prepared in the same manner as in Example 5 except that the DOBAMBC was replaced by 4-pentylphenyl-4-(4''-methylhexyl)-biphenyl-4'-carboxylate which is a liquid crystal compound causing successive phasc transition of isotropic phase, cholesteric phase, SmA and SmC* phase in the order named on temperature decrease. The liquid crystal device was observed in the same manner through a microscope, whereby a monodomain of SmC* phase with non-spiral structure was found to be formed.

EXAMPLE 7

A liquid crystal device was prepared in the same manner as in Example 5 except that the DOBAMBC was replaced by 4-hexyloxypheny-4-(2''-methylbutyl)-biphenyl-4'-carboxylate which is a liquid crystal causing successive phase transition of isotropic phase, cholesteric phase and SmC* phase in the order named on temperature decrease. The liquid crystal device was observed in the same manner through a microscope, whereby a monodomain of SmC* phase with non-spiral structure was found to be formed.

EXAMPLES 8–12

Liquid crystal devices were prepared in the same manner as in Example 5 except that the 5-n-hexyl-2-(4-hexyloxyphenyl)pyrimidine was replaced by N-(4-ethoxybenzylidene)-4-n-hexylaniline (Example 8), N-n-pentyl-4'-methoxyazobenzene (Example 9), 4-n-hexyl-4'-n-butoxyazobenzene (Example 10), 4-n-butylbenzoic acid-4'-n-hexyloxyphenyl ester (Example 11) and 4-(4-n-pentylphenyl)benzoic acid-4'-cyanophenyl ester (Example 12), respectively. The liquid crystal devices were subjected to similar microscopic observation, whereby a monodomain of SmC* phase with non-spiral structure was found to be formed.

COMPARATIVE EXAMPLE 1

A liquid crystal device was prepared in the same manner as in Example 2 except that the trans,trans-4'-propyldicyclohexyl-4-carbonitrile was omitted, and subjected to similar microscopic observation, whereby the resultant SmC* phase did not form a monodomain.

COMPARATIVE EXAMPLE 2

A liquid crystal device was prepared in the same manner as in Example 5 except that the 5-n-hexyl-2-(4-hexyloxyphenyl)pyrimidine as omitted, and subjected to similar microscopic observation, whereby the resultant SmC* phase did not form a monodomain.

Similarly, for the purpose of comparison, liquid crystal devices were prepared in the same manner as in Examples 6 and 7, respectively, except that the 5-n-hexyl-2-(4-hexyloxyphenyl)pyrimidine was omitted, whereby the SmC* phase attained in the respective devices failed to form a monodomain.

What is claimed is:

1. A liquid crystal apparatus comprising:
   (a) a liquid crystal device comprising a plurality of picture elements arranged in a plurality of rows and columns, each picture element comprising a pair of oppositely spaced electrodes and a ferroelectric liquid crystal having a first optically stable state and a second optically stable state disposed between the pair of oppositely spaced electrodes, said ferroelectric liquid crystal being a composition comprising a liquid crystal compound showing at least nematic phase and a liquid crystal compound showing at least chiral smectic phase; and
   (b) means for applying either one of a first voltage signal exceeding a first threshold voltage of the ferroelectric liquid crystal and a second voltage signal exceeding a second threshold voltage of the ferroelectric liquid crystal to the picture elements on a row for orienting the ferroelectric liquid crystal to either one of the first and second optionally stable states.

2. The liquid crystal apparatus according to claim 1, wherein the first voltage signal and the second voltage signal are applied in different phases selectively to the picture elements on the row.

3. The liquid crystal apparatus according to claim 2, wherein said liquid crystal composition is in chiral smectic phase.

4. The liquid crystal apparatus according to claim 3, wherein said liquid crystal composition is disposed in a layer thin enough to release the spiral structure intrinsic to the chiral smectic phase in the absence of an electric field.

5. The liquid crystal apparatus according to claim 2, wherein the electric fields of said first and second voltage signals are in mutually opposite directions.

6. The liquid crystal apparatus according to claim 2, wherein said first and second voltage signals have mutually opposite polarities.

7. The liquid crystal apparatus according to claim 2, wherein the duration of either the first voltage signal or the second voltage signal is from 0.1 $\mu$sec to 2 msec.

8. The liquid crystal apparatus according to claim 2, wherein either the first voltage signal or the second voltage signal has a voltage of 3 to 70 volts.

9. The liquid crystal apparatus according to claim 2, wherein said mutually opposite electrodes are provided by scanning signal-applying electrodes and information signal-applying electrodes, and said picture elements are respectively formed at each intersection of the scanning signal-applying electrodes and the information signal-applying electrodes.

10. The liquid crystal apparatus according to claim 1, wherein said liquid crystal composition is disposed in contact with a face subjected to a uniaxial orientation treatment.

11. The liquid crystal apparatus according to claim 10, wherein said uniaxial orientation treatment is a rubbing treatment.

12. The liquid crystal apparatus according to claim 10, wherein said uniaxial orientation treatment is an oblique vapor deposition treatment.

13. The liquid crystal apparatus according to claim 1, wherein said liquid crystal compound showing at least nematic phase is contained in a proportion of 0.1 to 50 parts by weight with respect to 100 parts by weight of said liquid crystal compound showing at least chiral smectic phase.

14. The liquid crystal apparatus according to claim 1, wherein said liquid crystal compound showing at least nematic phase is contained in a proportion of 1 to 20 parts by weight with respect to 100 parts by weight of said liquid crystal compound showing at least chiral smectic phase.

15. The liquid crystal apparatus according to claim 1, wherein said liquid crystal compound showing at least nematic phase is a liquid crystal showing a smectic phase on temperature decrease.

16. A liquid crystal apparatus comprising:
   (a) a liquid crystal device comprising a plurality of picture elements arranged in a plurality of rows and columns, each picture element comprising a pair of oppositely spaced electrodes and a ferroelectric liquid crystal having a first optically stable state and a second optically stable state disposed between the pair of oppositely spaced electrodes, said ferroelectric liquid crystal being a composition comprising a liquid crystal compound showing at least nematic phase and a liquid crystal compound showing at least chiral smectic phase; and
   (b) means for applying a first voltage signal for orienting the ferroelectric liquid crystal to the first optically stable state to a selected picture element on a row of picture elements, and a second voltage signal for orienting the ferroelectric liquid crystal to the second optically stable state to the remaining picture elements on the row.

17. The liquid crystal apparatus according to claim 16, wherein the electric fields of said first and second voltage signals are in mutually opposite directions.

18. The liquid crystal apparatus according to claim 16, wherein said first and second voltage signals have mutually opposite polarities.

19. The liquid crystal apparatus according to claim 16, wherein the first and second voltage signals are applied row by row, and the second voltage is applied in a time phase different from that for applying the first voltage signal.

20. The liquid crystal apparatus according to claim 19, wherein said liquid crystal composition is in chiral smectic phase.

21. The liquid crystal apparatus according to claim 20, wherein said liquid crystal composition is disposed in a layer thin enough to release the spiral sturcture intrinsic to the chiral smectic phase in the absence of an electric field.

22. The liquid crystal apparatus according to claim 16, wherein said liquid crystal composition is disposed in contact with a face subjected to a uniaxial orientation treatment.

23. The liquid crystal apparatus according to claim 22, wherein said uniaxial orientation treatment is a rubbing treatment.

24. The liquid crystal apparatus according to claim 22, wherein said uniaxial orientation treatment is an oblique vapor deposition treatment.

25. The liquid crystal apparatus according to claim 16, wherein said liquid crystal compound showing at least nematic phase is contained in a proportion of 0.1 to 50 parts by weight with respect to 100 parts by weight of said liquid crystal compound showing at least chiral smectic phase.

26. The liquid crystal apparatus according to claim 16, wherein said liquid crystal compound showing at least nematic phase is contained in a proportion of 1 to 20 parts by weight with respect to 100 parts by weight of said liquid crystal compound showing at least chiral smectic phase.

27. The liquid crystal apparatus according to claim 16, wherein said liquid crystal compound showing at least nematic phase is a liquid crystal showing a smectic phase on temperature decrease.

* * * * *

UNITED STATES PATENT AND TRADEMARK OFFICE
CERTIFICATE OF CORRECTION

PATENT NO. : 4,714,323

DATED : December 22, 1987

INVENTOR(S) : KAZUHARU KATAGIRI, ET AL.

It is certified that error appears in the above-identified patent and that said Letters Patent is hereby corrected as shown below:

COLUMN 2

Line 32, "not" should be deleted.

COLUMN 4

Line 30, "pahse" should read --phase--.

COLUMN 8

Comp. 10, " $\underline{163.5°\ C.}$ isotropic phase "

should read -- $\underrightarrow{163.5°\ C.}$ isotropic phase --
$\underleftarrow{\phantom{xxxxxx}}$

COLUMN 9

Line 34, "liquied" should read --liquid--.

Comp. D, "

"

should read

--

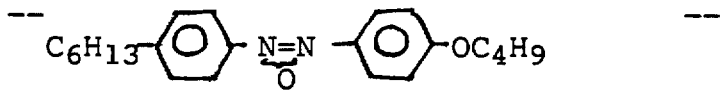

--

UNITED STATES PATENT AND TRADEMARK OFFICE
CERTIFICATE OF CORRECTION

PATENT NO. : 4,714,323

DATED : December 22, 1987

INVENTOR(S) : KAZUHARU KATAGIRI, ET AL.

It is certified that error appears in the above-identified patent and that said Letters Patent is hereby corrected as shown below:

COLUMN 10

Line 36, "liquied" should read --liquid--.

Comp. E, "

"

should read

--
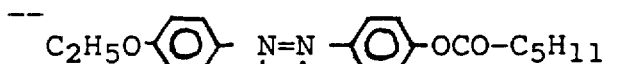
--

COLUMN 11

Line 2, "liquied" should read --liquid--.

COLUMN 12

Line 2, "liquied" should read --liquid--.

COLUMN 14

Line 48, "connected" should read --connected to--.
Line 55, "a 504" should read --a switch 504--.

COLUMN 15

Line 26, "100A of 1μ," should read --100A to 1μ,--.

UNITED STATES PATENT AND TRADEMARK OFFICE
CERTIFICATE OF CORRECTION

PATENT NO. : 4,714,323

DATED : December 22, 1987

INVENTOR(S) : KAZUHARU KATAGIRI, ET AL.

It is certified that error appears in the above-identified patent and that said Letters Patent is hereby corrected as shown below:

COLUMN 16

Line 62, "indicated to" should read --indicated in FIG. 7D. In this instance, the voltage V is set to--.

COLUMN 17

Line 28, "signals state" should read --signals corresponding to one frame is completed. The signal state--.

COLUMN 18

Line 27, "bort" should read --port--.

COLUMN 19

Line 7, "dicylohexyl-" should read --dicyclohexyl---.
Line 25, "pnase" should read --phase--.
Line 64, "strate" should read --strates--.
Line 68, "bland" should read --blank--.

COLUMN 20

Line 20, "phasc" should read --phase--.

COLUMN 21

Line 23, "optionally" should read --optically--.

UNITED STATES PATENT AND TRADEMARK OFFICE
CERTIFICATE OF CORRECTION

PATENT NO. : 4,714,323
DATED : December 22, 1987
INVENTOR(S) : KAZUHARU KATAGIRI, ET AL.

It is certified that error appears in the above-identified patent and that said Letters Patent is hereby corrected as shown below:

COLUMN 22

Line 41, "voltage is" should read --voltage signal is--.

Signed and Sealed this

Fifth Day of April, 1988

Attest:

DONALD J. QUIGG

Attesting Officer

Commissioner of Patents and Trademarks